United States Patent
Duncan

(10) Patent No.: US 8,092,312 B2
(45) Date of Patent: Jan. 10, 2012

(54) MULTI-PIECE YOKE ASSEMBLY

(75) Inventor: Bruce A. Duncan, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 352 days.

(21) Appl. No.: 12/361,795

(22) Filed: Jan. 29, 2009

(65) Prior Publication Data

US 2010/0190559 A1  Jul. 29, 2010

(51) Int. Cl.
*F16D 1/064* (2006.01)

(52) U.S. Cl. ............... 464/134; 464/182; 403/359.5

(58) Field of Classification Search ........... 464/134, 464/182, 901; 403/267–269, 359.5
See application file for complete search history.

(56) References Cited

U.S. PATENT DOCUMENTS

| | | | |
|---|---|---|---|
| 1,541,007 A | | 6/1925 | Thiemer |
| 2,952,999 A | * | 9/1960 | Glover ..................... 464/182 |
| 3,999,786 A | * | 12/1976 | Powondra ............... 403/268 X |
| 4,127,741 A | * | 11/1978 | Bauer et al. ............. 403/268 X |
| 4,136,982 A | * | 1/1979 | Sagady ................. 403/359.5 X |
| 4,915,536 A | * | 4/1990 | Bear et al. ................ 403/267 |
| 5,647,683 A | * | 7/1997 | Easley ..................... 403/359.6 |
| 5,735,747 A | | 4/1998 | Gehrke et al. .............. 464/133 |
| 6,348,002 B1 | | 2/2002 | Breese ....................... 464/182 |
| 6,367,680 B1 | | 4/2002 | Duggan ....................... 228/107 |
| 7,029,398 B1 | | 4/2006 | Burnard ..................... 464/134 |
| 7,140,969 B2 | | 11/2006 | Prucher ...................... 464/134 |
| 7,228,787 B2 | * | 6/2007 | Zins ..................... 403/269 X |
| 7,314,416 B2 | * | 1/2008 | Loughrin et al. ........... 464/182 |

FOREIGN PATENT DOCUMENTS

| | | | | |
|---|---|---|---|---|
| JP | 58-91925 A | * | 6/1983 | .............. 403/268 |
| JP | 3-248727 A | * | 11/1991 | .............. 464/134 |

OTHER PUBLICATIONS

Wagner, E. R., Universal Joint and Driveshaft Design Manual, AE-7, Society of Automotive Engineers, Inc., Warrendale, PA, p. 327, TJ1079.S62 1979.*

* cited by examiner

*Primary Examiner* — Gregory Binda
(74) *Attorney, Agent, or Firm* — Harness, Dickey & Pierce, P.L.C.

(57) ABSTRACT

A driveline yoke assembly may include a yoke and a barrel. The yoke may include first and second arms extending from a base. The base may include a first protrusion extending radially therefrom. The barrel may be axially fixed to the yoke and may define an axially extending body having a second protrusion extending radially therefrom and engaged with the first protrusion to transfer rotation from the barrel to the yoke.

17 Claims, 6 Drawing Sheets

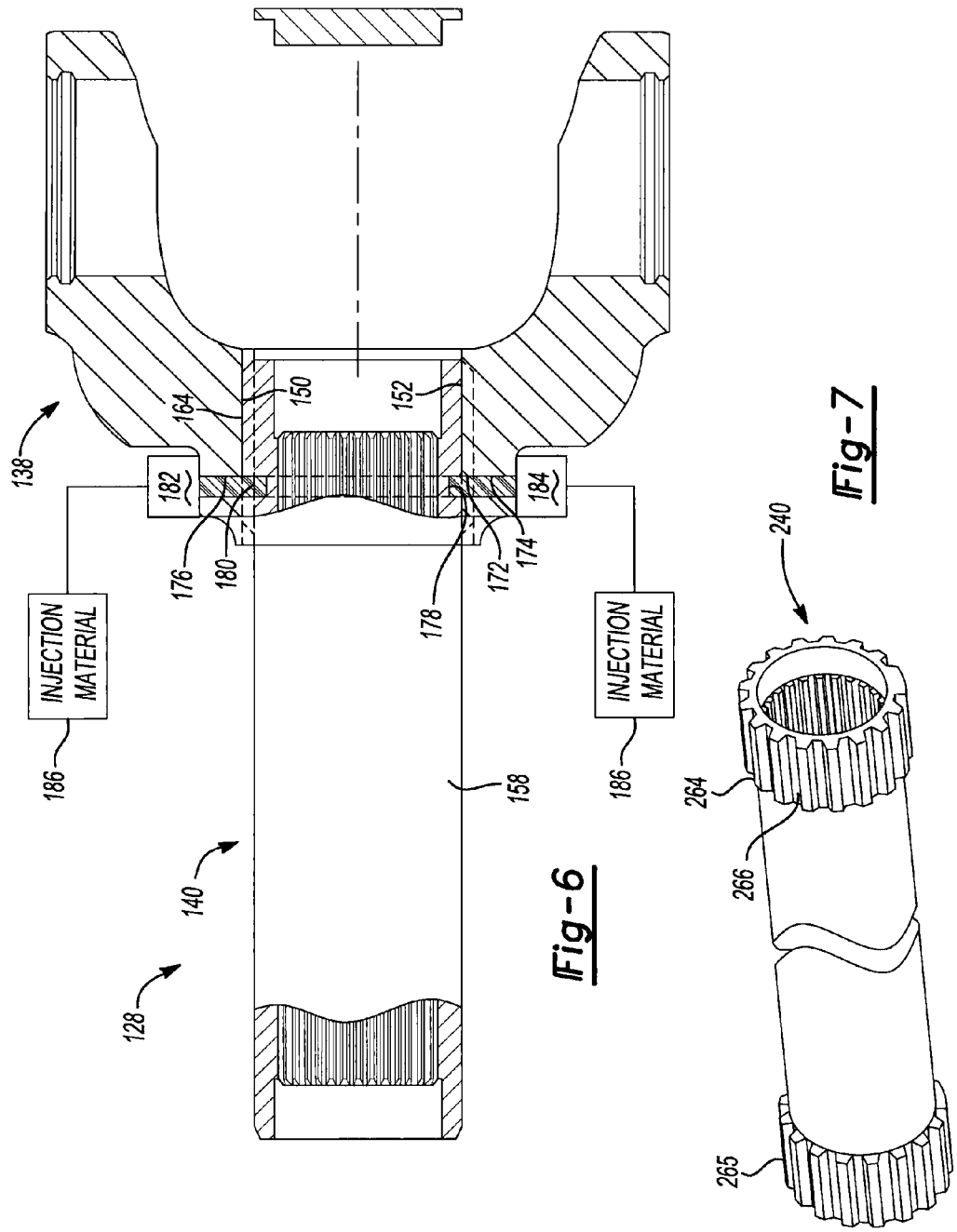

MULTI-PIECE YOKE ASSEMBLY

FIELD

The present disclosure relates to vehicle drivelines and more specifically to yoke assemblies of vehicle drivelines.

BACKGROUND

This section provides background information related to the present disclosure which is not necessarily prior art.

Universal joints are commonly used in drivelines of automobiles and trucks. The universal joint transmits power between two rotating shafts. A typical universal joint includes a pair of opposed yoke assemblies coupled to one another via a trunnion. Each yoke assembly typically includes a yoke portion and a barrel portion. The yoke and barrel portions are typically a unitarily formed member. Therefore, different yoke and barrel portions are not interchangeable with one another and both are formed from the same material.

SUMMARY

This section provides a general summary of the disclosure, and is not a comprehensive disclosure of its full scope or all of its features.

A driveline yoke assembly may include a yoke and a barrel. The yoke may include first and second arms extending from a base. The base may include a first protrusion extending radially therefrom. The barrel may be axially fixed to the yoke and may define an axially extending body having a second protrusion extending radially therefrom and engaged with the first protrusion to transfer rotation from the barrel to the yoke.

An alternate driveline yoke assembly may include a yoke, a barrel, and a retaining member. The yoke may include first and second arms extending from a base. The base may define a first axial bore having a first circumferential groove extending radially therein. The barrel may define an axially extending body located within the first axial bore and defining an outer radial surface. The outer radial surface may have a second circumferential groove disposed therein and axially aligned with the first circumferential groove. The retaining member may be located within the first and second circumferential grooves and may axially secure the yoke to the barrel.

A method of forming a yoke assembly may include forming a yoke having a first coupling portion and selecting a barrel from a group of barrels. The barrels within the group may each have at least one differing feature and may each have a common second coupling portion. The second coupling portion may be configured to engage the first coupling portion of the yoke. The method may further include engaging the second coupling portion from the selected barrel with the first coupling portion of the yoke to couple the yoke for rotation with the selected barrel. The forming the yoke may include forging.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a section view of the yoke assembly of FIG. 5; and

FIG. 7 is a perspective view of an alternate barrel for a yoke assembly according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
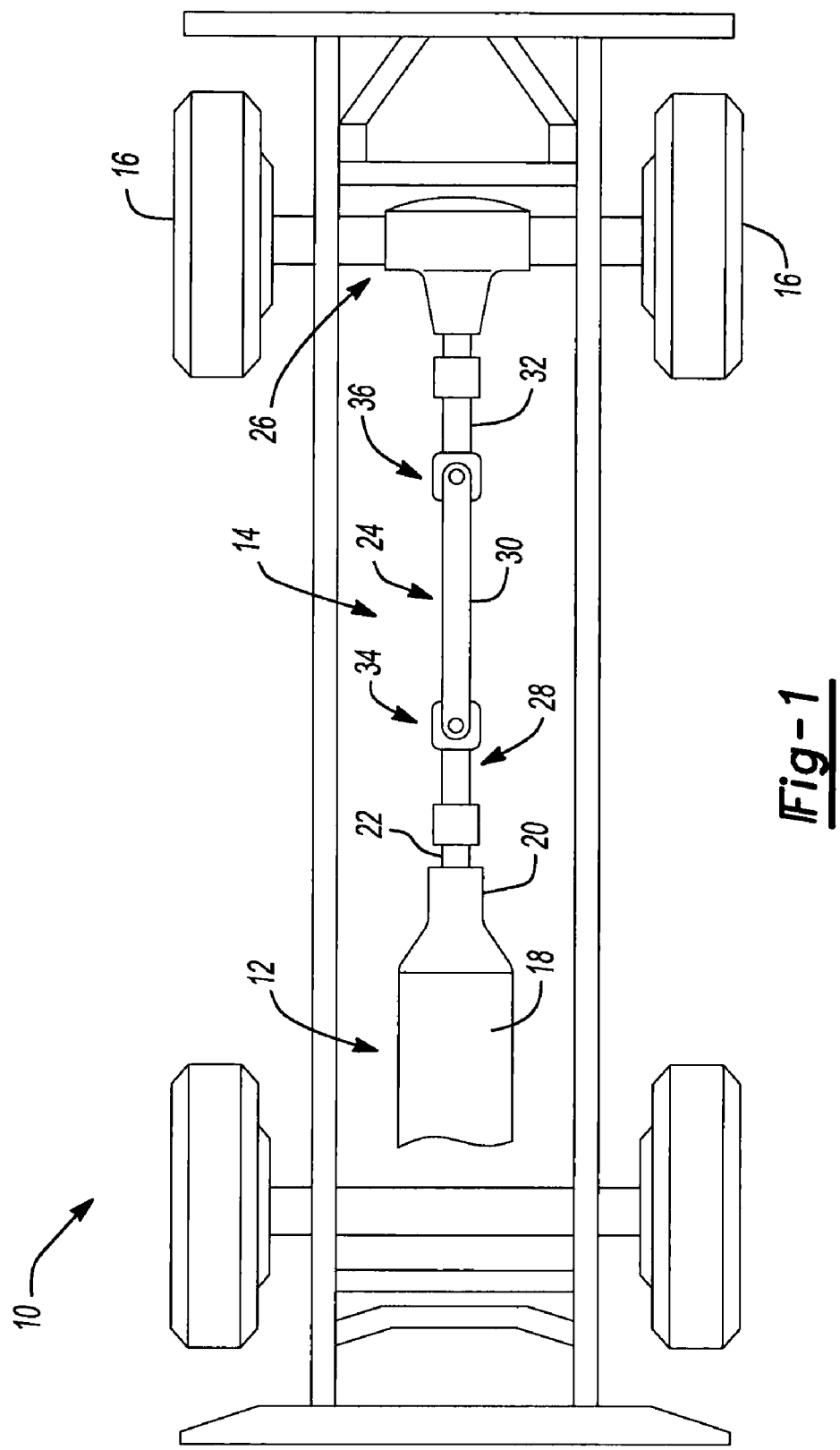
FIG. 1 is a schematic illustration of a vehicle according to the present disclosure.

With reference to FIG. 1, a vehicle 10 may include a powertrain 12, a driveline 14, and wheels 16. The driveline 14 may be driven by the powertrain 12 and may drive the wheels 16. The powertrain 12 may include an engine 18 and a transmission 20. The transmission 20 may include an output shaft 22 engaged with the driveline 14.

The engine 18 may be mounted in an in-line or longitudinal orientation along the axis of the vehicle 10. The output of the engine 18 may be coupled to the transmission 20 via a clutch (not shown) to transmit rotary power from the engine to the transmission 20. The rotary power may be transmitted from the output shaft 22 of the transmission 20 to the driveline 14. The driveline 14 may include a propshaft assembly 24 driven by the output shaft 22 of the transmission 20 and driving rotation of the rear axle 26, and therefore wheels 16.

The propshaft assembly 24 may include a yoke assembly 28 and first and second driveline components 30, 32. A first universal joint 34 may be formed by the engagement between the yoke assembly 28 and the first driveline component 30 and a second universal joint 36 may be formed by the engagement between the first and second driveline components 30, 32.

Figure 2:
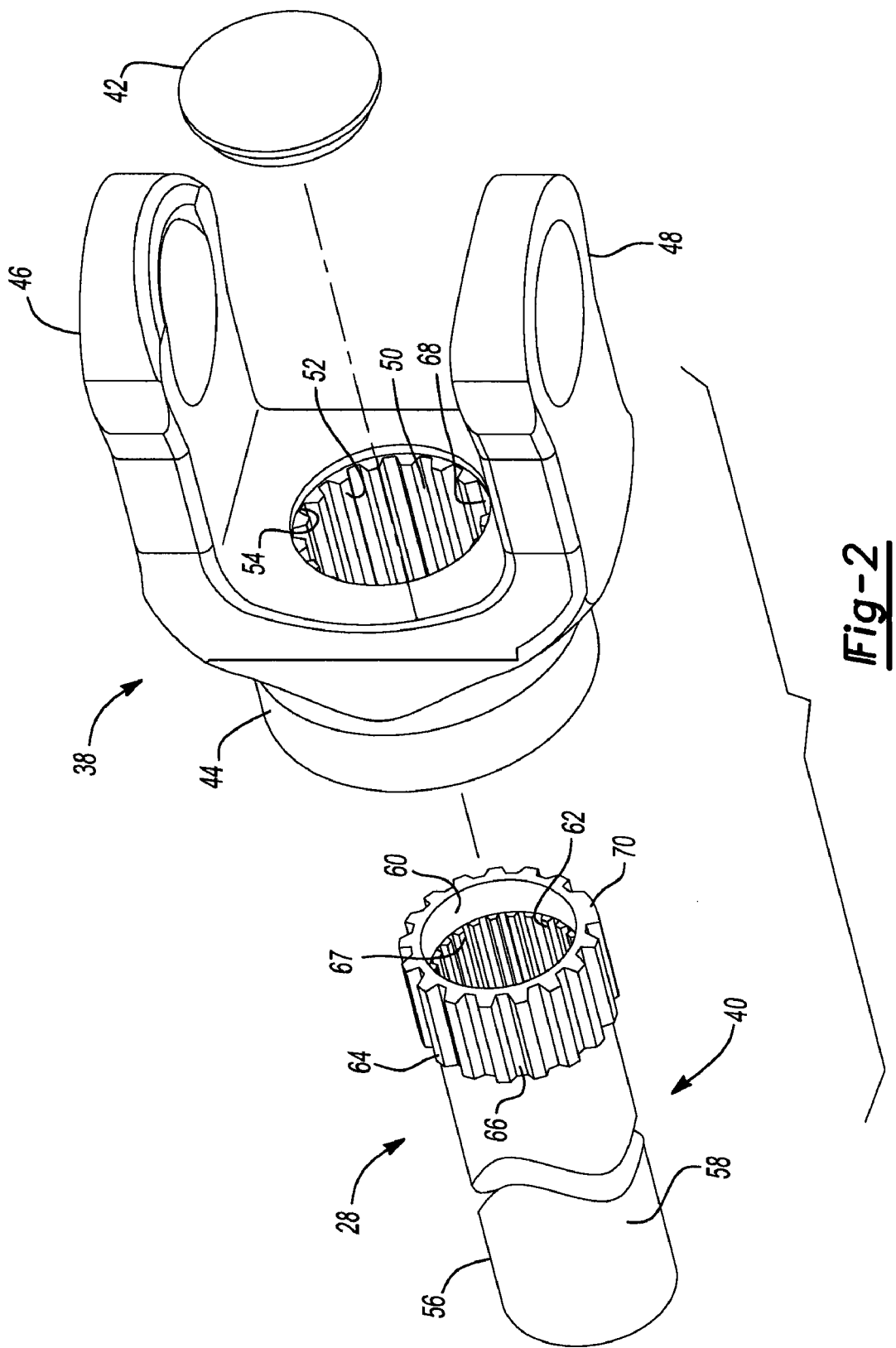
FIG. 2 is a perspective exploded view of a yoke assembly of the vehicle shown in FIG. 1.
Figure 3:
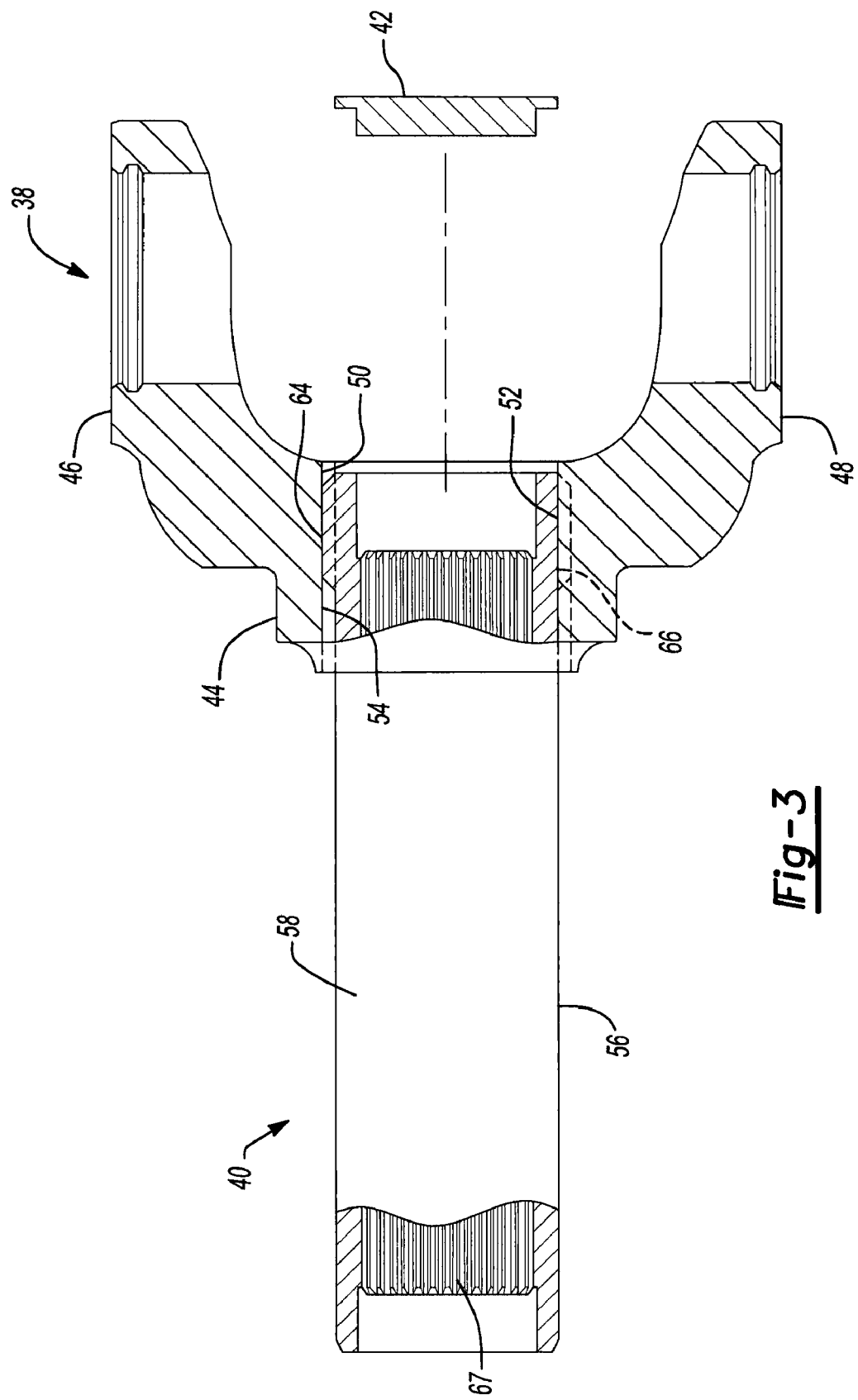
FIG. 3 is a section view of the yoke assembly of FIG. 2.
Figure 4:
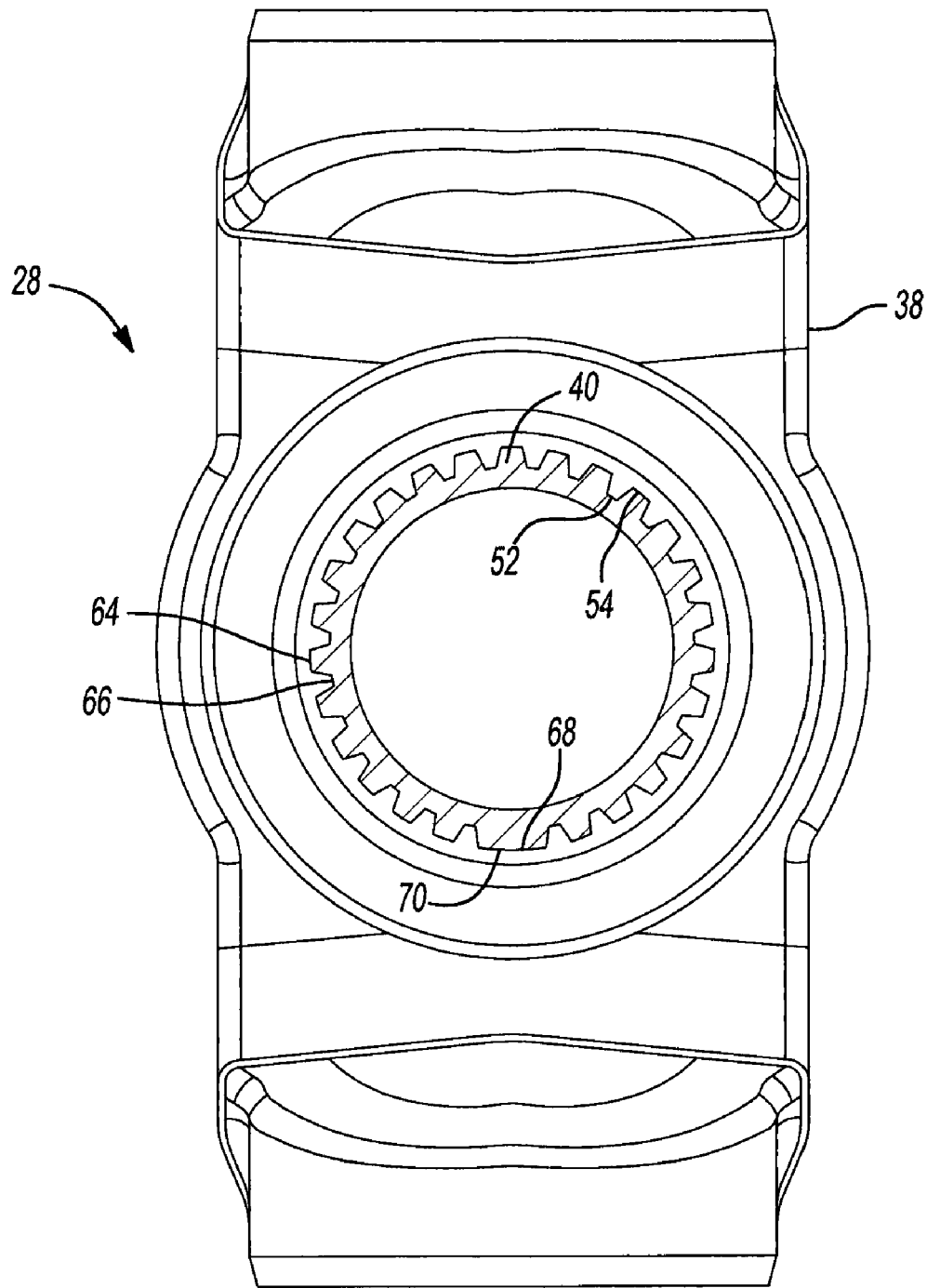
FIG. 4 is an additional section view of the yoke assembly of FIG. 2.

Referring to FIGS. 2-4, the yoke assembly 28 may include a yoke 38, a barrel 40, and a cap 42. The yoke 38 may include a base 44 having first and second arms 46, 48 extending therefrom. The base 44 may include an axially extending bore 50 receiving the barrel 40 therein. The bore 50 may define a coupling region including a series of radially inward extending protrusions 52 circumferentially spaced from one another having recesses 54 disposed therebetween. The protrusions 52 may form a first set of splines.

The barrel 40 may include an axially extending body 56 having an outer radial surface 58 and an axially extending bore 60 defining an inner radial surface 62. The outer radial surface 58 may define a coupling region including a series of radially outward extending protrusions 64 circumferentially spaced from one another having recesses 66 disposed therebetween. The protrusions 64 may form a second set of splines. The protrusions 52, 64 on the yoke 38 and the barrel 40 may be engaged with one another to transmit rotation from the barrel 40 to the yoke 38. The inner radial surface 62 of the barrel 40 may be coupled to the output shaft 22 of the transmission 20. The yoke assembly 28 may form a slip-yoke assembly. More specifically, the inner radial surface 62 may include a set of splines 67 engaged with splines (not shown) on the output shaft 22, providing for axial displacement therebetween.

The yoke 38 and barrel 40 may additionally include a rotational orientation feature. The yoke 38 may include a locating recess 68 having a circumferential width that is different from the remainder of the recesses 54 and the barrel 40 may have a corresponding locating protrusion 70 having a circumferential width that is different from the remainder of the protrusions 64. In the present example, the recess 68 and protrusion 70 are shown having increased circumferential widths. The recess 68 and protrusion 70 may provide for a predetermined and repeatable orientation of the yoke 38 and barrel 40 relative to one another during assembly.

The end cap 42 may be fixed to the base 44 and may cover the bore 50 to inhibit entry of debris. The end cap 42 may be fixed to the base 44 in a variety of ways including welding. The yoke 38 and barrel 40 may be rotationally fixed to one another through the engagement between the protrusions 52, 64 discussed above. The yoke 38 and barrel 40 may be axially secured to one another in a variety of ways including an adhesive, a weld, or an interference fit, such as a press fit. If a loose fit is employed, a tolerance ring (not shown) may be used to create a reduced clearance for frictional engagement.

Figure 5:
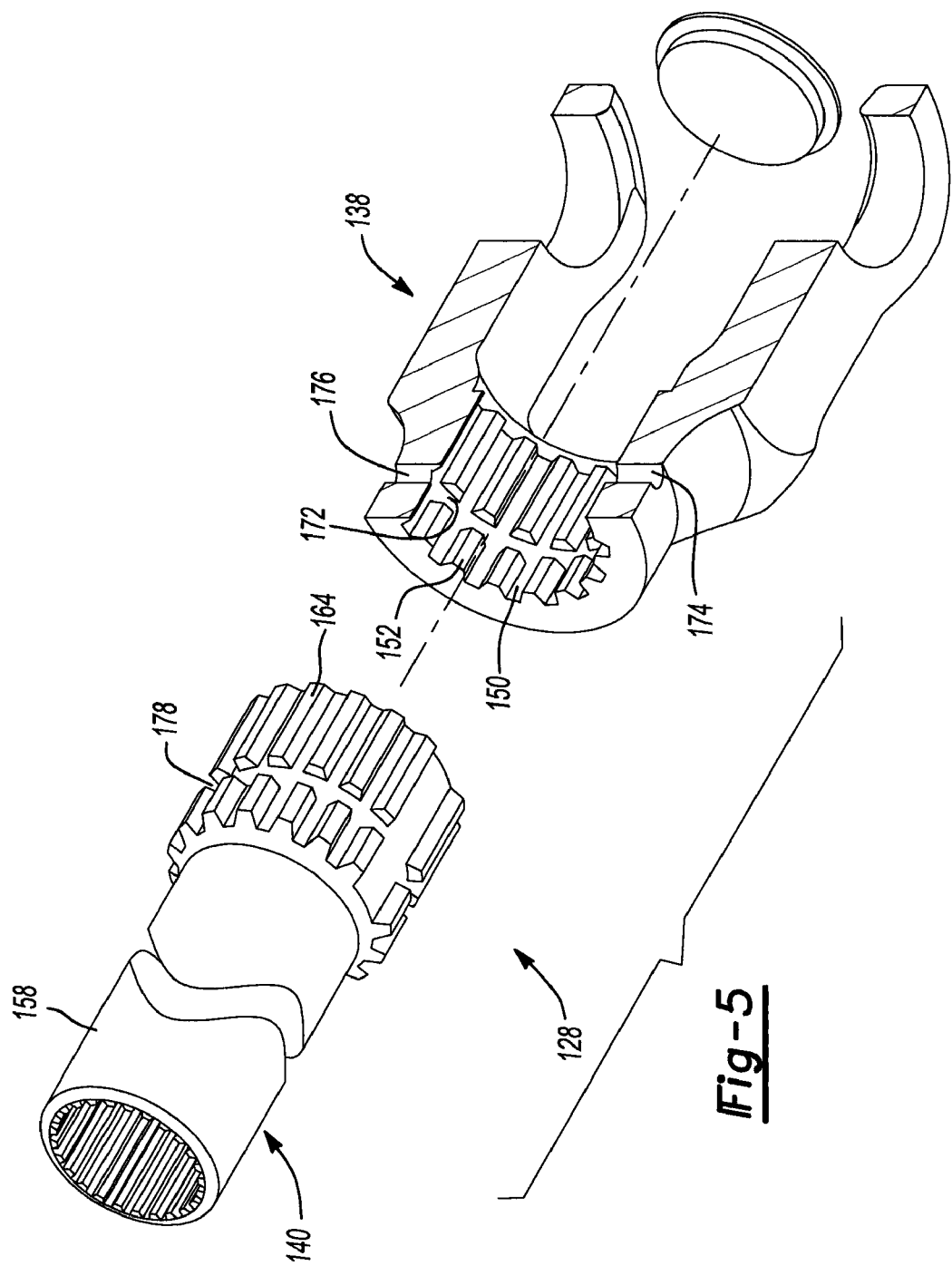
FIG. 5 is a perspective exploded view of an alternate yoke assembly according to the present disclosure.

In an alternate arrangement, seen in FIGS. 5 and 6, a yoke assembly 128 may include a yoke 138 and a barrel 140 axially secured to one another through an injection molding process. The yoke assembly 128 may be generally similar to the yoke assembly 28. Therefore, it is understood that the description of the yoke assembly 28 applies equally to the yoke assembly 128, with the exceptions indicated below. The axially extending bore 150 in the yoke 138 may include a first circumferential groove 172 and first and second passages 174, 176 extending from an outer surface of the yoke 138 into the first circumferential groove 172. The first circumferential groove 172 may intersect the protrusions 152. The outer radial surface 158 of the barrel 140 may include a second circumferential groove 178 axially aligned with the first circumferential groove 172. The second circumferential groove 178 may intersect the second protrusions 164. A retaining member 180 may be located within the first and second circumferential grooves 172, 178 and may have a generally annular body.

The retaining member 180 may be formed from a plastic within the first and second circumferential grooves 172, 178. The retaining member may be injection molded into the first and second circumferential grooves 172, 178 through the first and second passages 174, 176 in the yoke 138. More specifically, forming the retaining member 180 may include positioning a first mold housing 182 over the yoke 138 and in communication with the first passage and positioning a second mold housing 184 over the yoke 138 and in communication with the second passage 176. The mold housings 182, 184 may each be in communication with a mold material from an injection mold source used to form the retaining member 180. As indicated above, the mold material may include a variety of plastics. The mold material may be injected into and conform to the geometry of the first and second circumferential grooves 172, 178.

With reference to FIGS. 2 and 5, the yoke 38, 138 and barrel 40, 140 may be formed from different materials. For example, the yoke 38, 138 may be formed from steel and the barrel 40, 140 may be formed from iron. The yoke 38, 138 may be formed by forging and the barrel 40, 140 may be formed by casting. In addition to providing for use of different materials for the yoke 38, 138 and the barrel 40, 140, the separate components may provide for increased flexibility during assembly. For example, a common barrel 40, 140 may be used for a variety of yokes 38, 138 as long as the splines on the given yoke 38, 138 match the splines on the barrel 40, 140. Conversely, a common yoke 38, 138 may be used for a variety of barrels 40, 140, as long as the splines on the given barrel 40, 140 match the splines on the yoke 38, 138.

By way of non-limiting example, and with reference to FIGS. 2 and 7, a common yoke 38 may be used in combination with either the barrel 40 (FIG. 2) or with the barrel 240 (FIG. 7). The barrel 240 may define a coupling region including a series of radially outward extending protrusions 264 circumferentially spaced from one another having recesses 266 disposed therebetween generally similar to the coupling region of the barrel 40. However, other features of the barrel 240 may differ from the barrel 40. For example, the barrel 240 may have a length that is greater than the length of the barrel 40. The barrel 240 may alternatively or additionally include other unique characteristics, such as an additional series of circumferentially spaced radially outward extending protrusions 265 at an opposite end of the barrel 240.

The common coupling region of the barrels 40, 240 may generally provide for interchangeability of the barrels 40, 240 while using a common yoke 38. The barrels 40, 240 may form a group of barrels having at least one differing feature (i.e., length and/or protrusions 265) and a common coupling portion. A method of forming a yoke assembly may include forming the yoke 38 having a first coupling portion and selecting a barrel 40, 240 from the group of barrels. The second coupling portion may be configured to engage the first coupling portion of the yoke. The method may further include engaging the second coupling portion from the selected barrel 40, 240 with the first coupling portion of the yoke 38 to couple the yoke 38 for rotation with the selected barrel 40, 240. As indicated above, since the barrels 40, 240 are formed as separate members, the yoke 38 may be formed by a forging process.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A driveline yoke assembly comprising:
    a yoke including first and second arms extending from a base defining a first axial bore including a first protrusion extending radially inward therefrom;
    a barrel axially fixed to the yoke and defining an axially extending body located in the first axial bore and defining an outer radial surface having a second protrusion extending radially outward therefrom and engaged with the first protrusion to transfer rotation from the barrel to the yoke, a first circumferential groove defined between the barrel and the yoke within the first axial bore; and
    a retaining member located within the first circumferential groove and axially fixing the barrel within the first axial bore, the yoke including a radial passage extending into the first circumferential groove to provide a passage for injection of a material into the first circumferential groove to form the retaining member.

2. The yoke assembly of claim 1, wherein the first axial bore of the yoke includes the first circumferential groove extending radially therein and the outer radial surface of the barrel includes a second circumferential groove extending radially therein and axially aligned with the first circumferential groove, the retaining member located within the first and second circumferential grooves and axially fixing the yoke and the barrel to one another.

3. The yoke assembly of claim 2, wherein the yoke includes a radial passage provides extending into the first circumferential groove to provide a passage for injection of the material into both the first and second circumferential grooves to form the retaining member.

4. The yoke assembly of claim 3, wherein the retaining member is formed from a plastic.

5. The yoke assembly of claim 1, further comprising a cap, the barrel extending into a first end of the first axial bore and the cap secured to the base and covering a second end of the first axial bore opposite the first end to prevent debris from entering the first axial bore at the second end.

6. The yoke assembly of claim 1, wherein the barrel includes a second axial bore axially displaceable on and rotationally coupled to a transmission output shaft to rotationally drive the yoke assembly.

7. The yoke assembly of claim 1, wherein the yoke is formed from a first material and the barrel is formed from a second material different from the first material.

8. The yoke assembly of claim 7, wherein the yoke is formed from steel and the barrel is formed from iron.

9. The yoke assembly of claim 1, wherein the base of the yoke defines a first set of splines including the first protrusion and the barrel defines a second set of splines engaged with the first set of splines and including the second protrusion.

10. A driveline yoke assembly comprising:
a yoke including first and second arms extending from a base, the base defining a first axial bore having a first circumferential groove extending radially therein and a radial passage extending into the first circumferential groove;
a barrel defining an axially extending body located within the first axial bore and defining an outer radial surface having a second circumferential groove disposed therein and axially aligned with the first circumferential groove; and
a retaining member located within the first and second circumferential grooves and axially securing the yoke to the barrel, wherein the radial passage provides a passage for injection of a material into the first and second circumferential grooves to form the retaining member.

11. The yoke assembly of claim 10, wherein the first axial bore includes a first protrusion extending radially inward therefrom and the outer radial surface of the barrel includes a second protrusion extending radially outward therefrom and engaged with the first protrusion to transfer rotation from the barrel to the yoke.

12. The yoke assembly of claim 11, wherein the first circumferential groove intersects the first protrusion and the second circumferential groove intersects the second protrusion.

13. The yoke assembly of claim 12, wherein the base of the yoke defines a first set of splines including the first protrusion and the barrel defines a second set of splines including the second protrusion.

14. The yoke assembly of claim 10, wherein the yoke is formed from a first material and the barrel is formed from a second material different from the first material.

15. The yoke assembly of claim 14, wherein the yoke is formed from steel and the barrel is formed from iron.

16. A driveline yoke assembly comprising:
a yoke including first and second arms extending from a base, the base defining an axial bore having inner spline teeth and a first circumferential groove;
a barrel defining an axially extending body having outer spline teeth and a second circumferential groove, a portion of the body is located within the axial bore such that the outer spline teeth are meshed with the inner spline teeth and the second groove is generally aligned with the first groove; and
a retainer member located within said first and second grooves for axially securing the barrel to the yoke, wherein a radial bore extends through the base of the yoke and communicates with the first and second grooves, and wherein the retainer member is made from a material injected into the first and second grooves through the radial bore which upon solidification forms the retainer member.

17. The driveline yoke assembly of claim 16, wherein the first circumferential groove intersects the inner spline teeth and the second circumferential groove intersects the outer spline teeth.

* * * * *

UNITED STATES PATENT AND TRADEMARK OFFICE
CERTIFICATE OF CORRECTION

PATENT NO. : 8,092,312 B2  
APPLICATION NO. : 12/361795  
DATED : January 10, 2012  
INVENTOR(S) : Bruce A. Duncan Page 1 of 1

It is certified that error appears in the above-identified patent and that said Letters Patent is hereby corrected as shown below:

In the Specification:

Column 3, line 40 After "member", insert --180--.

Column 3, line 45 After "passage", insert --174--.

Column 3, line 49 After "source", insert --186--.

In the Claims:

Column 5, lines 1-5, Claim 3

"The yoke assembly of claim 2, wherein the yoke includes a radial passage provides extending into the first circumferential groove to provide a passage for injection of the material into both the first and second circumferential grooves to form the retaining member."

should be

--The yoke assembly of claim 2, wherein the radial passage provides for injection of the material into both the first and second circumferential grooves to form the retaining member.--.

Signed and Sealed this  
Third Day of September, 2013

Teresa Stanek Rea  
*Acting Director of the United States Patent and Trademark Office*